United States Patent [19]
Yoham

[11] Patent Number: 4,502,244
[45] Date of Patent: Mar. 5, 1985

[54] LANDSCAPE DEVICE FOR TREES
[76] Inventor: Kevin P. Yoham, 6901 SW. 72nd Ct., Miami, Fla. 33143
[21] Appl. No.: 541,458
[22] Filed: Oct. 13, 1983
[51] Int. Cl.³ ............................................. A01G 17/00
[52] U.S. Cl. ........................................... 47/25; 47/33
[58] Field of Search .................. 47/25, 23, 32, 27, 33, 47/48.5

[56] References Cited
U.S. PATENT DOCUMENTS

| | | | |
|---|---|---|---|
| 80,012 | 7/1868 | Robbins | 47/32 |
| 3,571,972 | 3/1971 | Carter | 47/25 |
| 4,087,938 | 5/1978 | Koch | 47/48.5 |
| 4,308,688 | 1/1982 | Rivane | 47/25 |
| 4,336,666 | 6/1982 | Caso | 47/25 X |

FOREIGN PATENT DOCUMENTS

| | | | |
|---|---|---|---|
| 2920873 | 11/1980 | Fed. Rep. of Germany | 47/25 |
| 628344 | 10/1927 | France | 47/48.5 |
| 834309 | 11/1938 | France | 47/48.5 |
| 63176 | of 1914 | Hungary | 47/25 |
| 496987 | 3/1976 | U.S.S.R. | 47/32 |

*Primary Examiner*—Robert A. Hafer
*Attorney, Agent, or Firm*—John Cyril Malloy

[57] ABSTRACT

This invention is of a device to be positioned at the base of the tree and includes an annular receptacle to be nested in the earth about a tree extending radially outwardly therefrom which tree extends through a central opening and wherein the receptacle includes an upper tray arranged over the receptacle to hold decorative material. There is an annular space provided between the wall of the tray and the outer peripheral receptacle proper into which feed fertilizer and water may be introduced in fluid form to flow through holes in the receptacle to feed the root system of the tree.

7 Claims, 4 Drawing Figures

U.S. Patent  Mar. 5, 1985  4,502,244
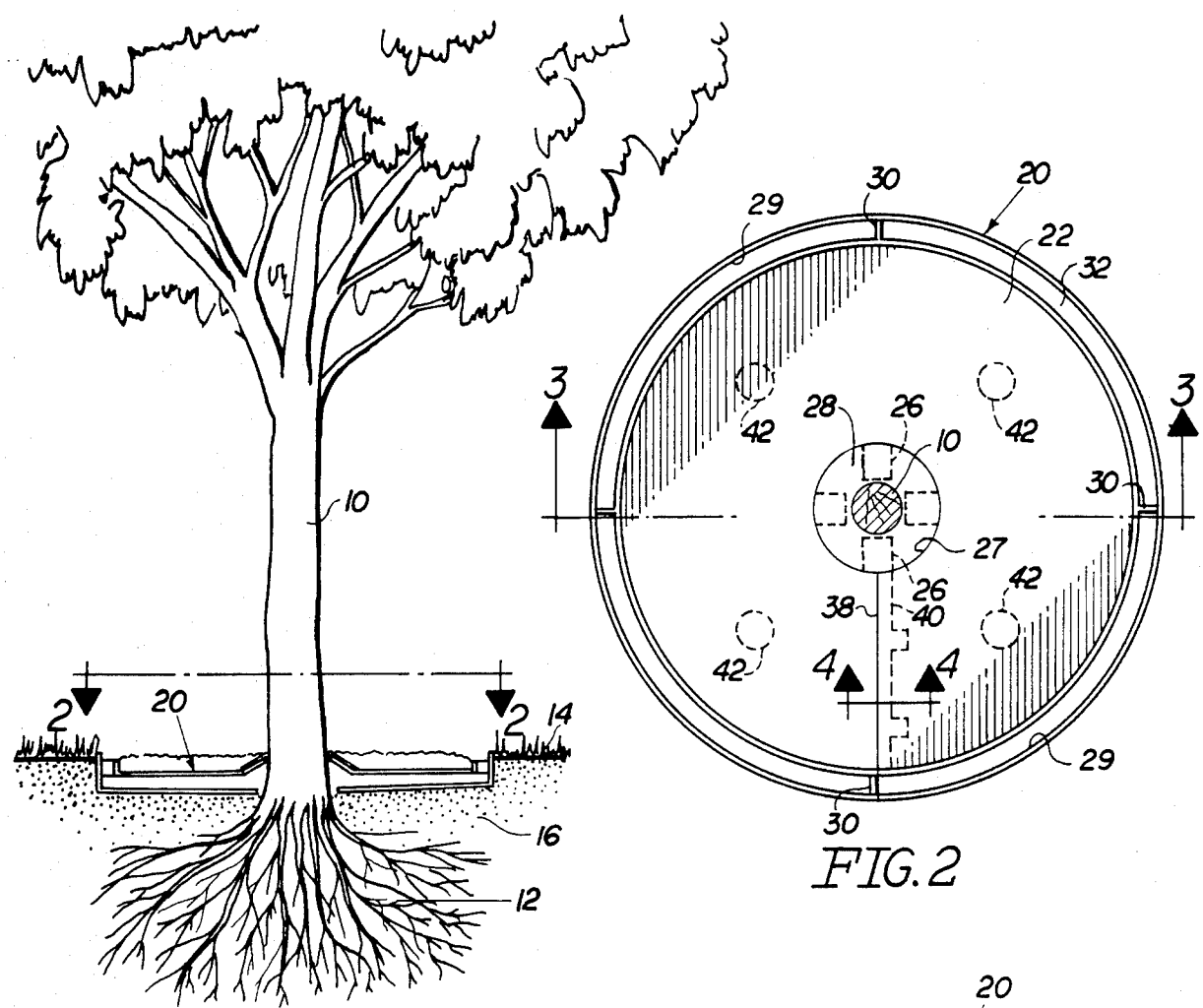
FIG.1
FIG.2
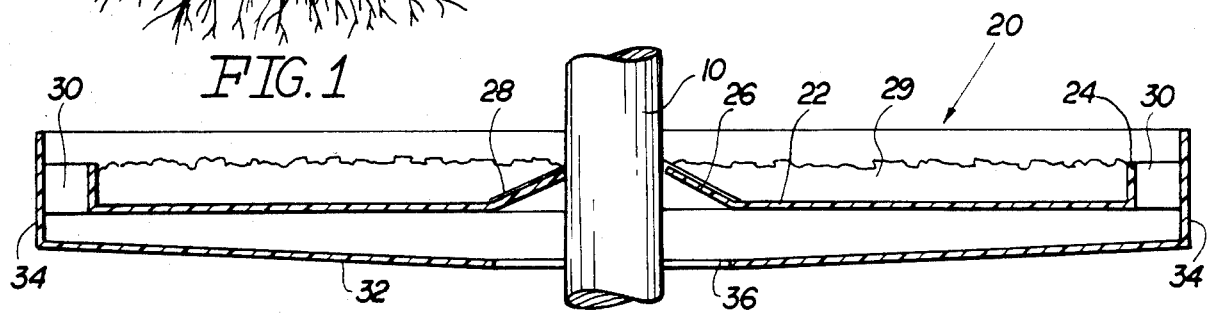
FIG.3
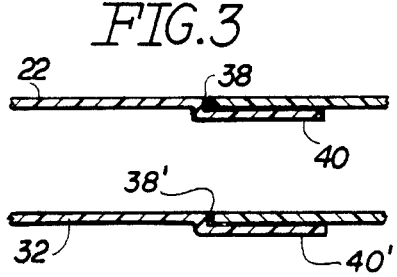
FIG.4

LANDSCAPE DEVICE FOR TREES

FIELD OF THE INVENTION

This invention relates to a landscaping device to be positioned at the base of a tree.

BACKGROUND OF THE INVENTION

In the past there have been numerous types of devices which have been utilized at the base of trees for the purpose of keeping undesired growth away from it. This invention is of such a device; and it is composed of a receptacle to be nested in the earth surrounding a tree. The receptacle has a floor with a pattern of holes. A tray providing an upper floor is arranged in the receptacle to receive bark or other decorative material. The upper floor is supported by webs in spaced relation inwardly from the wall of the receptacle. This defines an annular space to charge water and fertilizer into the receptacle to flow over the lower floor through holes provided in it to water and feed a tree.

It is a general object of this invention to provide a device of the type described hereinafter which is simple and inexpensive to manufacture and well adapted for the purpose for which it is intended as is set forth more fully hereinafter.

BRIEF DESCRIPTION OF THE DRAWINGS

FIG. 1 is an elevation view illustrating the instant invention arranged at the base of a tree;

FIG. 2 is a plan view as indicated by the line 2—2 of FIG. 1 and looking in the direction of the arrows;

FIG. 3 is a view in cross section taken on the plane indicated by the line 3—3 of FIG. 2 and looking in the direction of the arrows;

FIG. 4 is a partial view in cross section of that zone indicated by the arrowed line 4—4 of FIG. 2.

DESCRIPTION OF THE PREFERRED EMBODIMENT

The device generally designated by the numeral 20 at the base of the tree 10 will now be described. In a recess prepared in the ground 14 about the tree, extending substantially into the soil as generally indicated at 16, and above the roots 12, the device is positioned as shown. It is composed of a receptacle having a lower floor 32 and upstanding sidewalls 34. Preferably, the device is generally circular as shown. It is seen that the floor has a central through opening 36. Above the floor and suspended by webs 30 there is a tray with a floor 22 having an outer peripheral wall 24 extending upwardly in spaced relation from the outer wall 34 of the receptacle. The trunk 10 of the tree extends through the opening 36 of lower floor 32 and through an opening 27 in the floor 22 of the tray. Opening 36 and 27 are coaxial with one another. Flexible finger-like members 26 extend from the floor 22 of the tray with their distal ends respectively bearing against the trunk of the tree permitting growth of it and tending to support the inner portion of the tray.

With reference to FIGS. 2, 3 and 4, a radial slit is provided in floor 22 extending from the inner central opening 27 outwardly to the periphery of floor 22. A correspondingly positioned mating edge portion 40 (FIG. 3) is disposed underneath such that the edge portions adjacent the radial slip 38 are disposed in overlapping relation to one another. Similarly, floor 32 of the receptacle has a similarly structured radial slit 38' extending from the central opening 36 outwardly to the outer periphery thereof and a mating edge portion 40' is disposed beneath slit 38' such that the correspondingly positioned edges (FIG. 4) are disposed in overlapping relation to one another. The correspondingly positioned edge portions defining the respective radial slits 38 and 38' are not sealingly connected to one another so as to allow water drainage therebetween and further allows the device to be opened such that the respective overlapping edges of floor 22 and floor 32 defining the respective radial seams 38 and 38' are readily separated so as to allow opening of the device such that it may be fitted about and in surrounding relation to the base of the tree 10.

It will also be seen that in the floor 32, in addition to the central opening 36, there are a plurality of holes, designated by the numeral 42 in FIG. 2 for a purpose now to be explained. In use, water is poured or otherwise collected in the annular space between the outer wall of the device 34 and the tray wall 24 which flows over the floor 36 and through the holes 42 and central opening 36 watering the root system 12 of the tree 10. Within the tray pieces of bark or mulch may be arranged. This device, thus, provides an edged neat appearing base about a tree which prohibits the growth of grass or weeds adjacent the tree, provides a decorative bark peripherally about the tree and also provides for watering of the tree creating a pleasant landscaping effect with low maintenance requirements.

In the preferred embodiment an annular thin film 28 with a central opening may be provided. For example, a film of dark plastic which is flexible and pliable may be secured in covering relation to the fingers 26 and central aperture 27 into which such fingers 26 extend so as to resist any falling of leaves and debris into the lower portion of the device at the space between the tree and the tray. However, film 28 is not secured or disposed in sealing relation to aperture 27. This allows additional water drainage to pass beneath the film 28 and pass through aperture 27 so as to drain from the device.

It is thus seen that the invention is composed of a circular plastic disk that is positioned in the ground around the tree after the tree is planted. It can be utilized not only to keep weeds away from the tree but also to feed the tree fertilizer as well as water. In the preferred embodiment the material of the receptacle and tray is of a relatively durable plastic which may be about ¼ or ⅛ of an inch in thickness and preferably the lip of the outer wall of the receptacle extends upwardly about ½ inch above the upper terminal end of the wall of the tray, the tray wall being about 1¼ inches in height. There results a device wherein weeding is not required about the base of the tree nor is edging. This reduces the amount of time and effort required to maintain a lawn in which such a device is arranged about a tree and it provides for more rapid growth of the tree and an attractive appearing tree.

What is claimed is:

1. A device to be positioned at the base of a tree in surrounding relation thereto, said device comprising:
    (a) a receptacle means including a floor extending from a first central opening in adjacent, surrounding relation to the tree, radially and outwardly therefrom to an outer peripheral portion of said receptacle means,
    (b) a tray means disposed above and in spaced relation to said receptacle means, said tray means including an upper floor extending radially and outwardly from a second central opening formed in said upper floor to an outer peripheral portion of said tray means, said outer peripheral portion of said tray means being disposed in inwardly spaced relation from said outer peripheral portion of said receptacle means, (c) said second central opening disposed in adjacent, surrounding relation to the tree and in coaxial relation to said first central opening, (d) a peripheral channel having an annular configuration and disposed between and at least partially defined by said respective peripheral portions of said receptacle means and said tray means in communicating relation to said receptacle floor, (e) web means disposed within said peripheral channel in attached interconnecting relation between said respective peripheral portions, said web means structured and disposed to supportingly position said tray means in spaced relation to said receptacle means;

(f) a first radial slit and a second radial slit formed respectively in said receptacle floor and said upper floor and each extending radially and outwardly from said first central opening and said second central opening through said respective peripheral portions, and (g) whereby said device can be opened for placement relative to the tree.

2. A device as in claim 1 wherein each of said radial slits is disposed adjacent overlapping edges of said respective receptacle floor and upper floor, said respective overlapping edges disposed in non-liquid sealing engagement to one another, whereby liquid is allowed to drain through said radial slits of said upper floor and receptacle floor from said device.

3. A device as in claim 2 further comprising a plurality of finger means disposed in spaced apart location to one another and connected to said upper floor and extending therefrom inwardly into said second central opening into engaging relation to said tree and at least partially supporting relation to said device via said latter engagement.

4. A device as in claim 3 further comprising film means disposed in substantially covering and non-sealing relation to said finger means and said second central opening, whereby debris is prevented from passing through said second central opening.

5. A device as in claim 1 wherein a plurality of drain apertures are integrally formed in said receptacle floor in spaced relation to one another and between said first central opening and said peripheral portion of said receptacle means.

6. A device as in claim 1 wherein each of said peripheral portions comprise upstanding peripheral walls disposed in spaced, substantially parallel relation to one another so as to define said peripheral channel therebetween.

7. A device as in claim 6 wherein said web means comprises a plurality of web elements disposed in spaced apart relation to one another within said peripheral channel, each web element having its opposite ends securely affixed to one of said upstanding peripheral walls, said plurality of web elements made from a substantially rigid material and being collectively disposed to support said tray means in upwardly spaced relation relative to said receptacle means.

* * * * *